May 21, 1968   J. F. BLUMENFELD   3,384,698
ELECTRODE HOLDER FOR GLASS MELTING FURNACE
Filed March 21, 1966
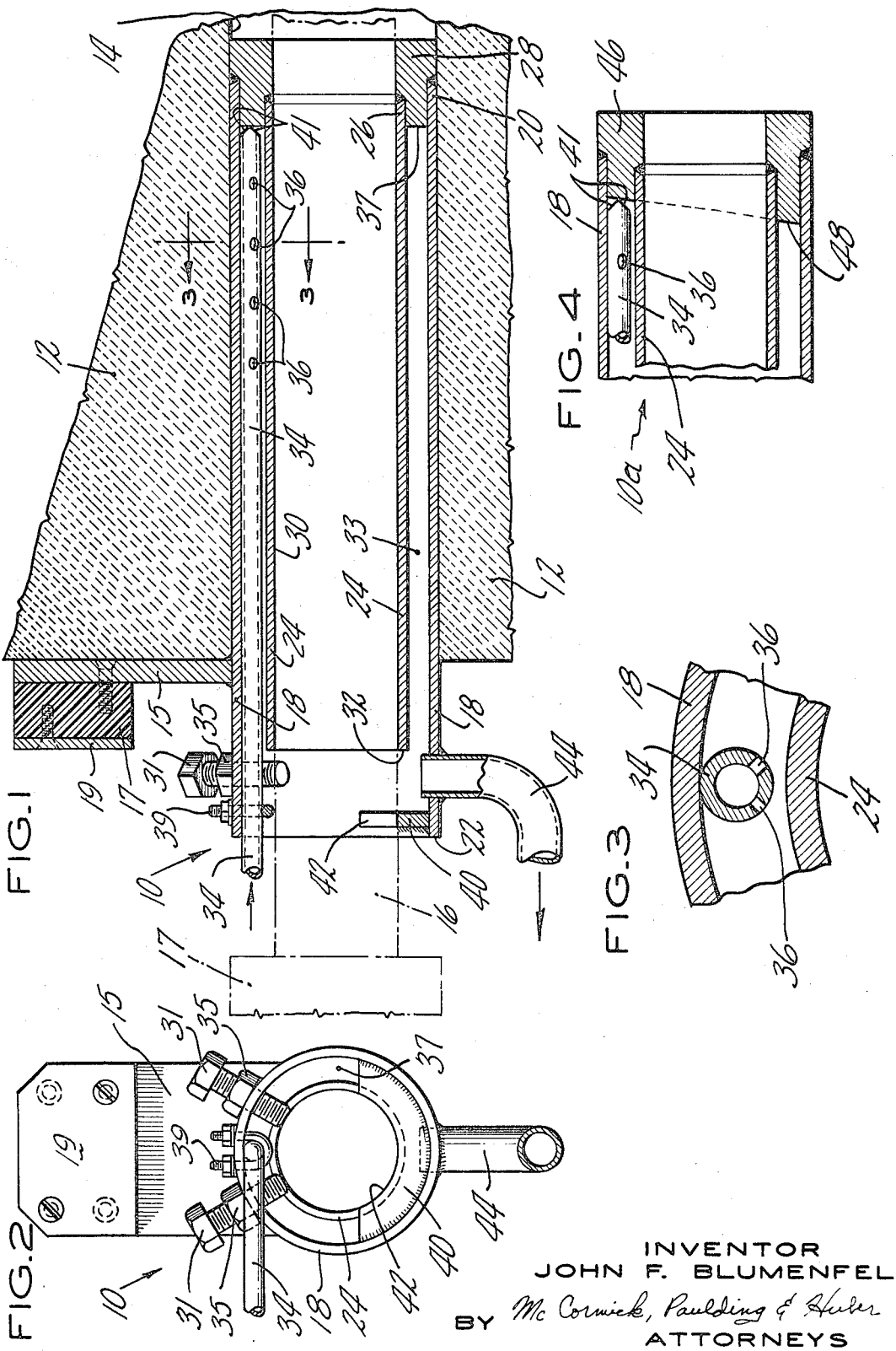
INVENTOR
JOHN F. BLUMENFELD
BY McCormick, Paulding & Huber
ATTORNEYS

United States Patent Office

3,384,698
Patented May 21, 1968

3,384,698
ELECTRODE HOLDER FOR GLASS
MELTING FURNACE
John F. Blumenfeld, Simsbury, Conn., assignor to Emhart Corporation, Bloomfield, Conn., a corporation of Connecticut
Filed Mar. 21, 1966, Ser. No. 535,916
12 Claims. (Cl. 13—6)

This invention relates to an electrode holder for use with an electrode inserted through an opening in the side wall or bottom of a glass melting furnace or the like, and deals more particularly with such an electrode holder which includes a means for cooling the electrode in the zone where it emerges from the hot furnace to prevent its oxidation.

Although not necessarily so limited, the electrode holder of this invention is intended primarily for use in a glass melting furnace wherein the electrode is used as part of an electrical circuit for applying electrical heating energy by Joule effect heating current to a body of glass, and for this reason, the invention is described herein as applied to such a furnace. The furnace may be either entirely electrically heated or the electrical energy may be used to supplement other heating means such as oil or gas burners. The electrical energy is applied by inserting electrodes, which are commonly cylindrical rods of molybdenum, through the refractory side walls or bottom of the furnace. An electrical potential is then applied between various pairs or groups of these electrodes to cause electric currents to flow through, and thereby heat, the molten glass. The major problem in the use of molybdenum and other electrodes is their susceptibility to oxidation in the zone where they emerge from the hot furnace and are in contact with the air, and in order to avoid rapid oxidation, it is common practice to apply some sort of cooling means to the electrodes in this zone.

The general object of this invention is to provide an improved electrode holder for supporting an electrode in a furnace and for providing a cooling of the electrode in the zone where it emerges from the furnace to prevent its oxidation.

A more particular object of the invention is to provide an electrode holder of the foregoing character which is of a very simple, economical construction and which may be used either with an electrode inserted horizontally through the side wall of a furnace or with an electrode inserted through the bottom of the furnace.

A still further object of this invention is to provide an electrode holder of the foregoing character which may be used with various different cooling media such as air, water or other fluids. In keeping with this object, a further object of this invention is to provide an electrode holder wherein the coolant is maintained out of contact with the electrode in the cooling zone and is prevented from entering the glass and thereby creating bubbles in the glass or causing localized cooling of the molten glass with the result that stones may appear in the glass being withdrawn from the tank, the molten glass also being prevented from entering the cooling chamber and plugging the coolant discharge device.

Another object of this invention is to provide an electrode holder of the foregoing character having a cooling chamber with an open outer end providing accessibility for maintenance and permitting visual inspection of the action of the coolant and the condition of the chamber.

Other objects and advantages of the invention will be apparent from the following description and from the drawing forming a part hereof.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is a vertical, sectional view taken on a plane passing through the longitudinal axis of an electrode holder embodying this invention.

FIG. 2 is an outer end view of the electrode holder of FIG. 1.

FIG. 3 is an enlarged fragmentary transverse sectional view taken on the line 3—3 of FIG. 1.

FIG. 4 is a fragmentary vertical sectional view showing the inner end portion of an electrode holder comprising another embodiment of this invention.

Turning now to the drawing wherein like reference numerals indicate like parts throughout the same, and first considering FIGS. 1, 2 and 3, an electrode holder embodying the present invention is shown generally at 10 and, in FIG. 1, is shown installed in the refractory side wall 12 of a glass melting furnace or the like. Its longitudinal axis is, therefore, horizontal and it is partially received in a corresponding aperture 14 formed in the side wall 12. In use, the holder 10 receives and supports an electrode 16 as shown by the phantom lines of FIG. 1. The electrode is of circular cross section and, as mentioned, is preferably made of molybdenum. In FIG. 1 the furnace chamber and the molten glass are located to the right of the holder 10 and the electrode normally projects quite some distance (a foot or more) beyond the holder 10 and into the molten glass. In FIG. 1 the electrode is shown by broken lines at 16 and its electrical power connector is also shown by broken lines at 17.

The holder 10 is made up of an outer cylindrical tubular sleeve 18, having an inner end 20 and an outer end 22, and a generally coaxially arranged inner tubular cylindrical sleeve 24 having an inner end 26, approximately axially aligned with the inner end 20 of the outer sleeve 18, and an outer end 32. Welded to the outer surface of the outer sleeve is an arm 15 used to hold the holder in place with respect to the furnace wall 12. The arm engages the outer surface of the furnace wall, and at its outer end includes a block 17 of electrical insulating material, such as a phenolic compound, which is fixed thereto and which carries a connecting plate 19, the connecting plate being connectible to the framework of the furnace or other structure for rigidly supporting the holder in place. The annular space between the outer and inner sleeve 18 and 24 is closed by an inner end bushing 28, the two sleeves and the bushing therefor defining an annular chamber 33 closed at its inner end and open at its outer end. The sleeves are fixed to the bushing by welding and in the illustrated case, the bushing extends inwardly toward the furnace a slight distance beyond both of the inner ends of the sleeves 18 and 24. The bushing is relieved on its outer surface to receive the inner end portion of the outer sleeve 18, thereby providing a continuous smooth external surface from the outer end 22 of the sleeve to the inner end of the bushing. Similarly, the bushing is relieved adjacent its internal surface to receive the inner end of the inner sleeve 24, the bore of the sleeve 24 thereby smoothly meeting with the bore of the bushing to provide a continuous smooth bore 30. The bore 30 is in turn of such a size as to accommodate the electrode 16 with sufficient looseness to permit the electrode to be moved axially of the holder when inserting it into or removing it from the holder.

The inner sleeve 24, in addition to supporting the electrode 16, serves as a guard or shield for preventing the cooling medium from striking the surface of the electrode in the zone adjacent the molten glass and, for this reason, extends along a substantial portion of the length of the entire holder 10. In some embodiments the inner sleeve 24 may be as long as or longer than the outer sleeve 18, but in the illustrated case it is slightly shorter than the outer sleeve so as to have its outer end 32 spaced a short distance inwardly from the outer end 22 of the outer sleeve. In the space between the outer end 32 of the inner sleeve 24 and the outer end 22 of the outer sleeve 18, the outer sleeve includes two angularly spaced screws 31, 31 which are engageable with the outer surface of the electrodes 16 to hold it in place relative to the holder. The screws pass radially through the upper portion of the wall of the sleeve 18 and are threadably received by nuts 35, 35 welded to the sleeve.

For cooling the electrode in the zone where it emerges from the furnace, the holder 10 further includes a means for directing a cooling medium onto the bushing 28 and also onto the outer surface of the inner sleeve in the area adjacent the inner ends 20 and 26 of the sleeves. This means may take various different forms, and in the illustrated holder 10 comprises a pipe 34 which extends through the annular chamber 33 from the outer end of the outer sleeve 18. The pipe has an open inner end facing the adjacent surface 37 of the bushing for directing cooling medium directly onto such surface and also includes a plurality of lateral discharge openings 36, 36 adjacent its inner end. The pipe 34 is held in place by a U-bolt 39, passing through the upper portion of the outer sleeve 18, adjacent its outer end and its inner end is preferably so formed that it may engage the bushing surface 37 without being closed. In the illustrated holder, this is accomplished but cutting the end of the pipe along two inclined lines, as at 41, 41, to form a point which is engageable with the bushing surface 37. Therefore, during assembly the pipe 34 may be inserted in the annular chamber 33 until its inner end engages the bushing, and this will cause it to be properly located. As best shown in FIGS. 2 and 3, the inner end portion of the pipe 34 is located directly above the central axis of the inner sleeve 24 and the discharge openings 36, 36 are so formed that some direct the cooling medium to one side of a vertical plane passing through said central axis while others direct the cooling medium to the other side of such plane, thereby passing a flow of coolant over both sides of the sleeve. In use, water, air, or other fluid cooling medium is supplied to the cooling pipe 34 from a suitable source and is discharged from the pipe through its open inner end and the discharge openings 36, 36 so as to flow over the adjacent surface 37 of the bushing and the outer surface of the inner sleeve 24. Thus, the bushing 28 and the inner end portion of the inner sleeve are cooled by the cooling medium and this cooling effect is transferred to the adjacent portion of the electrode 16. Maximum cooling of the electrode therefore takes place at the zone where it emerges from the protective glass coating which surrounds it in the furnace and where it first contacts the air, this being the hottest zone to contact the air, and at this zone the cooling medium is positively prevented from engaging or contacting the hot electrode. Also, in the arrangement shown, a major portion of the coolant is directed onto the bushing 28 by the open end of the pipe 34 and a lesser amount of coolant is distributed over the outer surface of the sleeve 24, thereby providing maximum cooling in the vicinity of the bushing as is desired.

In the case of air or other gaseous cooling medium, the heated or spent cooling medium is driven from the annular chamber 33, through its open outer end, by the fresh cooling medium supplied thereto through the pipe 34. In the case of water or other liquid cooling medium, the liquid discharged flows by gravity over the bushing surface 37 and the outer surface of the inner sleeve 24 to the bottom of the chamber 33. Also, when using a liquid cooling medium, the holder 10 further preferably includes a dam or wall 40 at the outer end of the outer sleeve 18 to prevent the liquid from flowing or spilling from the outer edge of said sleeve. This dam 40 is of such a shape as to extend along slightly less than half of the angular extent of the outer sleeve and includes an arcuate inner surface 42 conforming to the shape of the electrode 16 so as to form a seat therefor. The dam 40 and its seating surface 42 also serve as a means for reacting the radial force exerted on the electrode 16 by the retaining screws 31, 31 and, therefore, when the screws are tightened the electrode is clamped between the screws and dam to hold it axially in place and no excessive forces are transferred to the other end of the inner sleeve 24.

Cooperating with the dam 40 is a drain tube 44 which passes through the bottom portion of the sleeve 18 and which is connectible with a hose or other suitable drain conduit for draining the spent cooling medium from the bottom of the annular chamber 33. The mouth of the drain 44 may be flush with the inner surface of the outer sleeve 18 but, as shown in FIGS. 1 and 2, it preferably extends a slight distance upwardly beyond such inner surface so as to be located vertically between the surface 42 of the dam 40 and the bottom surface of the sleeve 18. This arrangement causes some relatively constant level of water to be maintained in the bottom of the annular chamber 33 despite the fact that the holder may be installed in the furnace at a slight angle to a horizontal plane. This assures relatively constant operating conditions from installation to installation. It is also of benefit during the times when the electrode is shifted in position relative to the holder. In shifting the electrode, the procedure followed includes the steps of shutting off the water or other coolant supply to allow the glass in contact with the holder and electrode to thaw, which may require about twenty minutes. At this point, the electrode may be moved to a new position and the coolant is then turned back on. During the period when the coolant is off, heat is absorbed by the water or other coolant which remains in the bottom of the chamber 33, and it is gradually vaporized to maintain an atmosphere of steam or other vapor in the container which acts to protect the electrode from oxidation during the period when the flow of coolant is stopped. In addition, the rate at which the holder rises in temperature during this period is diminished, as much of the heat is absorbed by the water and, therefore, problems of thermal shock are greatly lessened. During normal operation of the furnace, the coolant collected in the bottom of the chamber 33 also, in the same manner, acts as a safety device for protecting the electrode in case of a temporary or sudden stoppage of water flow. It should also be noted that the discharge openings 36, 36 are all located along the inner end portion of the inner sleeve 24 and this sleeve extends axially outwardly a substantial distance beyond the outermost discharge opening so that when a liquid cooling medium is used, the sleeve 24 prevents the cooling medium from directly contacting the outer surface of the electrode.

It will, of course, be understood that although FIG. 1 shows the holder 10 installed horizontally in the side wall of the furnace, it can also be installed in a vertical position through the bottom of a furnace. In such a vertical bottom installation, the holder is preferably used with air or other gaseous cooling medium and in such a case the drain 44 may be omitted from the holder if desired.

FIG. 4 is a fragmentary vertical sectional view of the inner end of an electrode holder 10a comprising another embodiment of the invention and which except for the modifications shown in this figure is or may be in all other respects similar to the holder 10 of FIGS. 1, 2 and 3. The holder 10a is primarily adapted for use with holders installed horizontally through the side wall of the furnace and using a liquid cooling medium. In FIG. 4, the inner end bushing of the holder is indicated at 46 and is identical with the bushing 28 of the holder 10 except for including an inclined face 48 at the inner end of the chamber 33. This inclination of the face 48 provides a more positive contact of the cooling medium with the bushing 46 insofar as the water or other cooling medium discharged onto the upper portion of the surface 48 will, due to the inclination of the surface, be caused to flow and distribute itself over the complete surface. This feature is also useful in the event that the holder is installed at a slight angle inclined upwardly relative to the horizointal plane insofar as the inclination of the surface 48 may be made greater than the angle at which the holder would normally be installed and therefore the surface 48 will remain inclined in the proper direction despite any slight incline of the holder.

The invention claimed is:

1. An electrode holder for supporting an electrode in an aperture passing through the wall or bottom of a glass melting furnace or the like, said electrode holder comprising an outer tubular sleeve adapted to be partially received in an aperture such as aforesaid and having an inner end and an outer end, an inner tubular sleeve located inside of said outer sleeve in substantially coaxial relation therewith and having an inner end substantially axially aligned with said inner end of said outer sleeve, means closing the space between said inner ends of said inner and outer sleeves, said inner sleeve extending along at least a major portion of the length of said outer sleeve so as to define an annular chamber between said inner and outer sleeves which annular chamber extends along at least a major portion of said outer tube and is open to the atmosphere at its outer end, said inner tubular sleeve having a bore adapted to receive an electrode such as aforesaid which passes through said inner sleeve and beyond said inner end thereof, and means for discharging a fluid cooling medium into said annular chamber adjacent the inner end thereof.

2. An electrode holder as defined in claim 1 further characterized by said means for discharging a fluid cooling medium comprising a pipe extending longitudinally through said annular chamber and havinng a plurality of lateral discharge openings passing through its wall in the portion thereof adjacent the inner end portion of said inner sleeve.

3. An electrode holder as defined in claim 1 further characterized by said means closing the space between said inner ends of said inner and outer sleeves comprising a bushing fixed to both of said sleeves and having an axially outwardly facing surface defining the inner end of said annular chamber, and said means for discharging a fluid cooling medium comprising a pipe extending longitudinally through said annular chamber and having an open inner end facing said bushing surface for directing said cooling medium directly onto said bushing surface.

4. An electrode holder as defined in claim 3 further characterized by said bushing surface being inclined relative to the longitudinal axis of said sleeves and said open inner end of said pipe being located adjacent the axially innermost point of said bushing surface.

5. An electrode holder as defined in claim 3 further characterized by said pipe including a plurality of lateral discharge openings passing through its wall in a longitudinal zone adjacent said bushing.

6. An electrode holder as defined in claim 1 further characterized in that, when said holder is orientated horizontally, said means for discharging a fluid cooling medium comprises a pipe passing through said annular chamber and having at least one discharge opening located above said inner sleeve, with the result that the cooling medium discharged therefrom flows downwardly over said outer surface of said inner sleeve and into the bottom portion of said annular chamber, said inner sleeve extending a sufficient distance axially outwardly from the zone of cooling medium discharge to prevent said cooling medium from directly contacting an electrode inserted in said inner sleeve when a liquid cooling medium is used.

7. An electrode holder as defined in claim 6 further characterized by a dam located adjacent the bottom portion of said outer sleeve to prevent liquid cooling medium from spilling from said outer end of said outer sleeve, said dam extending angularly for considerably less than 360° so as to leave a free opening between the atmosphere and said inner chamber, and a drain conduit passing through the bottom portion of said outer sleeve and communicating with said annular chamber, said drain conduit having a mouth located at a vertical level between the lower edge of said dam and the bottommost point of said annular chamber.

8. An electrode holder as defined in claim 6 further characterized by said means for closing the space between said inner ends of said sleeves comprising a bushing having a surface forming the inner end of said annular chamber, said latter surface being inclined to the axis of said sleeves with its axially innermost point located above said inner sleeve.

9. An electrode holder as defined in claim 1 further characterized in that, when said holder is orientated horizontally, said means for discharging a fluid cooling medium comprises a pipe passing through said annular chamber above said inner sleeve, said pipe in the portion thereof extending along the inner end portion of said inner sleeve including a plurality of lateral discharge openings, some of said openings being directed to one side of a vertical plane passing through the axis of said inner sleeve and other of said openings being directed to the other side of said plane, so that the cooling medium discharged thereform flows downwardly over both sides of said outer surface of said inner sleeve and into the bottom portion of said annular chamber.

10. An electrode holder as defined in claim 9 further characterized by said pipe having an open inner end through which cooling medium is discharged axially onto said means closing the space between said inner and outer sleeves, said open inner end being of such a size relative to said lateral discharge openings that the major portion of the cooling medium supplied to said annular chamber passes through said open inner end of said pipe.

11. An electrode holder as defined in claim 1 further characterized by said inner sleeve having an outer end spaced axially inwardly from said outer end of said outer sleeve, and at least one retaining screw passing radially through said outer sleeve in the portion thereof located outwardly beyond said outer end of said inner sleeve, said retaining screw being threadably carried by said outer sleeve and being engageable with the outer surface of an electrode inserted in said inner sleeve to retain said electrode in place.

12. An electrode holder as defined in claim 11 further characterized by a member carried by said outer sleeve and providing a surface engageable with said electrode at a point substantially diametrically opposite from said retaining screw, said electrode being clamped between said retaining screw and said member when said retaining screw is tightened.

References Cited

UNITED STATES PATENTS

| 1,363,815 | 12/1920 | Satlatwalla et al. | 13—16 |
| 2,693,498 | 11/1954 | Penberthy | 13—6 X |
| 2,736,759 | 2/1956 | Penberthy | 13—6 X |
| 2,908,738 | 10/1959 | Rough | 13—6 X |

BERNARD A. GILHEANY, *Primary Examiner.*

H. B. GILSON, *Assistant Examiner.*